United States Patent
Schat et al.

(10) Patent No.: US 11,169,952 B2
(45) Date of Patent: Nov. 9, 2021

(54) DATA TRANSMISSION CODE AND INTERFACE

(71) Applicant: NXP B.V., Eindhoven (NL)

(72) Inventors: Jan-Peter Schat, Hamburg (DE); Ling Wang, Suzhou (CN); Michael Zimin, Austin, TX (US)

(73) Assignee: NXP B.V., San Jose, CA (US)

( * ) Notice: Subject to any disclaimer, the term of this patent is extended or adjusted under 35 U.S.C. 154(b) by 0 days.

(21) Appl. No.: 16/848,223

(22) Filed: Apr. 14, 2020

(65) Prior Publication Data

US 2020/0341937 A1    Oct. 29, 2020

(30) Foreign Application Priority Data

Apr. 25, 2019  (CN) .......................... 201910343103.0

(51) Int. Cl.
  *G06F 13/42*    (2006.01)
(52) U.S. Cl.
  CPC ...... *G06F 13/4291* (2013.01); *G06F 13/4204* (2013.01); *G06F 2213/0004* (2013.01); *G06F 2213/3604* (2013.01)
(58) Field of Classification Search
  CPC ............. G06F 13/4291; G06F 13/4204; G06F 2213/0004; G06F 2213/3604
  See application file for complete search history.

(56) References Cited

U.S. PATENT DOCUMENTS

| | | | |
|---|---|---|---|
| 6,574,225 B2 * | 6/2003 | Reynolds | H04J 3/0632 370/395.62 |
| 9,110,133 B2 | 8/2015 | Wang et al. | |
| 10,565,156 B1 * | 2/2020 | Schat | H04L 25/493 |
| 2003/0016056 A1 * | 1/2003 | Matsuzaki | H04L 25/493 326/86 |

(Continued)

FOREIGN PATENT DOCUMENTS

| | | | |
|---|---|---|---|
| EP | 3731106 A1 * | 10/2020 | ......... G06F 13/4204 |
| WO | 2015/103009 A1 | 7/2015 | |

OTHER PUBLICATIONS

Burr-Brown Products from Texas Instruments: "TMP106—Digital Temperature Sensor with Two-Wire Interface", Datasheet, SLLS672A—Oct. 2005—Revised Jan. 2006, pp. 1-21.

(Continued)

*Primary Examiner* — Glenn A. Auve

(57) ABSTRACT

The disclosure relates to a data transmission interface for use in a first integrated circuit (IC) for encoding and sending a data packet from the first IC to a second IC via a data bus having four data wires, the data transmission interface arranged to generate four time-dependent binary signals which jointly encode the data packet in signal edges thereof, each of the signals being associated with a unique wire of the data bus and spanning a temporal cycle T within which are defined four consecutive time stamps $T_1 \ldots T_4$ at which edges can occur in the signals, the data transmission interface further arranged to transmit the signals to the second IC substantially in parallel on their respective data wires, wherein: irrespective of the data packet content, at each time stamp $T_1 \ldots T_4$ at least one of the four signals has an edge to enable clock recovery at the second IC.

19 Claims, 8 Drawing Sheets

(56) References Cited

U.S. PATENT DOCUMENTS

| | | | |
|---|---|---|---|
| 2010/0215118 A1 | 8/2010 | Ware et al. | |
| 2015/0098536 A1 | 4/2015 | Sengoku | |
| 2015/0168991 A1 | 6/2015 | Sengoku | |
| 2015/0363349 A1* | 12/2015 | Remple | G06F 13/4282 710/313 |
| 2019/0158100 A1* | 5/2019 | Lim | H03L 7/0814 |
| 2020/0349988 A1* | 11/2020 | Schat | G11C 7/1036 |

OTHER PUBLICATIONS

Hennessy et al.: "JTAG-Based Robust PCB Authentication for Protection Against Counterfeiting Attacks", IEEE, ASP-DAC 2016, 1B-2, pp. 1-6.

Moyer et al.: "A Technique for High-speed, Fine-Resolution Pattern Generation and its CMOS Implementation", IEEE, Proceedings Sixteenth Conference on Advanced Research in VLSI, Aug. 6, 2002, pp. 131-145.

Moyer et al.: "High Speed, Fine Resolution Pattern Generation Using the Matched Delay Technique", IEEE, Proceedings of ISCAS'95—International Symposium on Circuits and Systems, Apr. 30-May 3, 1995, pp. 405-408.

Moyer et al.: "The Delay Vernier Pattern Generation Technique", IEEE Journal of Solid-State Circuits, vol. 32, No. 4, Apr. 1997, pp. 551-562.

ON Semiconductor: "CAT25M01-EEPROM Serial 1-Mb SPI", datasheet, Jun. 2018—Rev. 3, pp. 1-17.

Prucnal et al.: "A Rate-Transparent, Self-Clocking line Code", IEEE, Proceedings of the IEEE, vol. 75, No. 8, Aug. 1987, pp. 1123-1125.

You et al.: "A Path-Matching Timing Optimization in Physical Design for DDR Port of a Global Switch Chip", IEEE, 2012 IEEE 11th International Conference on Solid-State and Integrated Circuit Technology, Oct. 29-Nov. 1, 2012, pp. 1-3.

* cited by examiner

DATA TRANSMISSION CODE AND INTERFACE

CROSS-REFERENCE TO RELATED APPLICATIONS

This application claims the priority under 35 U.S.C. § 119 of China application no. 201910343103.0, filed on 25 Apr. 2019, the contents of which are incorporated by reference herein.

FIELD

The disclosure relates to a data transmission interface for encoding and sending a data packet from a first integrated circuit (IC) to a second IC via a 4-wire data bus. The disclosure also relates to a data receiving interface for receiving and decoding a data packet sent from a first IC, to a second IC via a 4-wire data bus. The disclosure also relates to methods of data transmission and reception over a 4-wire data bus.

BACKGROUND

Integrated circuit (IC) development faces constantly growing pressure from competing targets such as low production cost and high I/O data rates. High data I/O rates often mandate a dedicated high-speed I/O (HSIO) interface such as Ethernet or CSI-2. This, however, implies dedicated physical hardware circuitry (PHY) which comes as a hard macro and often incurs licence costs.

While interfaces such as HSIO are desirable when $3^{rd}$ party ICs need to be addressed using a standardized interface, there are many applications where data transfer might instead be performed using general purpose I/O (GPIO) pins. In such protocols, a clock signal is either transferred from the transmitter to the receiver using a dedicated wire, or recovered locally at the receiver side. The achievable data rate is either 1 bit per data wire and cycle, if data is captured only at the rising or falling clock edge, or 2 bits per data wire and cycle if data is captured at both the rising and falling clock edge.

It is an object of the present disclosure to provide a data encoding scheme, and transmission and receiving interfaces employing same, which enables a channel capacity greater than 2 bits per cycle per data wire and which do not necessarily require a dedicated clock wire between the transmitter and receiver such that all bus wires can be used as data wires.

SUMMARY

According to a first aspect of the present disclosure there is provided a data transmission interface for use in a first integrated circuit, IC, for encoding and sending a data packet from the first IC to a second IC via a data bus having four data wires, the data transmission interface arranged to generate four time-dependent binary signals which jointly encode the data packet in signal edges thereof, each of the signals being associated with a unique wire of the data bus and spanning a temporal cycle T within which are defined four consecutive time stamps $T_1 \ldots T_4$ at which edges can occur in the signals, the data transmission interface further arranged to transmit the signals to the second IC substantially in parallel on their respective data wires, wherein:

irrespective of the data packet content, at each time stamp $T_1 \ldots T_4$ at least one of the four signals has an edge to enable clock recovery at the second IC;

the time difference between $T_2$ and $T_3$ is greater than both the time difference between $T_1$ and $T_2$ and also the time difference between $T_3$ and $T_4$; and no signal has edges at both $T_1$ and $T_2$ and no signal has edges at both $T_3$ and $T_4$.

Advantageously, full clock recovery is possible at the second IC, because at each time stamp $T_1 \ldots T_4$ at least one of the four signals is guaranteed to have an edge. Therefore it is not necessary to have a dedicated clock wire which advantageously means that all bus wires can be used for data transmission, thereby maximizing the possible data rate. Furthermore, by not having a permanent clock wire, electromagnetic interference is reduced within and around the integrated circuits and hence the risk of disturbing neighbouring electronic devices is reduced. The absence of a dedicated clock also reduces the energy consumption of the integrated circuits. Furthermore, the encoding scheme is DC-free by design, since it relies on edges, and therefore channels with a lower frequency limit are not of concern, something which requires special mitigation in other interfaces such as Ethernet. Further advantageously, the data transmission and reception can be performed using standard GPIO pins thereby not requiring the use of a third party HSIO interface such as Ethernet of CSI-2 which avoids additional physical-layer circuitry and licencing costs.

In one or more embodiments the data transmission interface comprises a lookup table which stores, for each possible data packet, a unique set of values corresponding to signal edges, the data transmission interface being further arranged to determine, from the lookup table, the set of values corresponding to said data packet.

In one or more embodiments the data transmission interface comprises four shift registers, one associated with each signal, the data transmission interface being further arranged to load said set of values into the shift registers and thereafter shift said set of values out of the shift registers in parallel using a common clock, thereby generating the four time-dependent binary signals jointly encoding the data packet.

According to a second aspect of the present disclosure there is provided a data receiving interface for use in a second integrated circuit, IC, for receiving and decoding a data packet sent from a first IC to the second IC via a data bus having four data wires, the data receiving interface arranged to receive four time-dependent binary signals which jointly encode the data packet in signal edges thereof, each of the signals being associated with a unique wire of the data bus and spanning a temporal cycle T within which are defined four consecutive time stamps $T_1 \ldots T_4$ at which edges can occur in the signals, the data receiving interface further arranged to decode the data packet from the four signals, wherein:

irrespective of the data packet content, at each time stamp $T_1 \ldots T_4$ at least one of the four signals has an edge to enable clock recovery at the data receiving interface;

the time difference between $T_2$ and $T_3$ is greater than both the time difference between $T_1$ and $T_2$ and also the time difference between $T_3$ and $T_4$; and no signal has edges at both $T_1$ and $T_2$ and no signal has edges at both $T_3$ and $T_4$.

In one or more embodiments the data receiving interface comprises a clock recovery circuit arranged to generate a clock signal which toggles its output whenever a signal edge occurs on any one of the four data wires.

In one or more embodiments the clock recovery circuit comprises a finite state machine.

In one or more embodiments the data receiving interface further comprises a data recovery circuit arranged to receive the clock signal and the four time-dependent binary signals as inputs and to decode the data packet therefrom.

In one or more embodiments the data recovery circuit comprises four shift registers, one associated with each of the four signals, the shift registers arranged to be populated with values corresponding to edges of the received signals and to be triggered from the clock signal.

In one or more embodiments the data recovery circuit comprises a lookup table which stores, for each possible data packet, a unique set of values corresponding to signal edges, the lookup table being arranged to convert the output contents of the shift registers to thereby decode the data packet.

In one or more embodiments the data receiving interface further comprises a data alignment module arranged to compensate offsets in travel times of the four signals from the first IC to the second IC.

In one or more embodiments the time difference between $T_2$ and $T_3$ is at least twice the time difference between $T_1$ and $T_2$ and at least twice the time difference between $T_3$ and $T_4$ In one or more embodiments within the cycle T, times stamps $T_1 \ldots T_4$ are given by (i.e. occur at):

$$T_1=0.2*T;$$

$$T_2=T_1+0.1*T;$$

$$T_3=T_2+0.4*T; \text{ and}$$

$$T_4=T_3+0.1*T.$$

In one or more embodiments the data packet comprises 11 bits of data and the cycle T has a duration of less than 50 ns, preferably substantially 10 ns such that a data transmission rate of at least 1 Gbit per second can be achieved.

According to a third aspect of the present disclosure there is provided a data transmission system comprising a first integrated circuit, IC, having a data transmission interface according to the first aspect connected to a second IC having a data receiving interface according to the second aspect via a data bus having four data wires.

In one or more embodiments the first IC forms part of a production testing device and the second IC is a device under test.

According to a fourth aspect of the present disclosure there is provided a method of encoding and sending a data packet from a first integrated circuit, IC, to a second IC via a data bus having four data wires, the method comprising:

generating, at a data transmission interface of the first IC, four time-dependent binary signals which jointly encode the data packet in signal edges thereof, each of the signals being associated with a unique wire of the data bus and spanning a cycle T within which are defined four of consecutive time stamps $T_1 \ldots T_4$ at which edges can occur in the signals; and transmitting the signals to the second IC substantially in parallel on their respective bus wires, wherein:

irrespective of the data packet content, at each time stamp $T_1 \ldots T_4$ at least one of the four signals has an edge to enable clock recovery at the second IC;

the time difference between $T_2$ and $T_3$ is greater than both the time difference between $T_1$ and $T_2$ and also the time difference between $T_3$ and $T_4$; and no signal has edges at both $T_1$ and $T_2$ and no signal has edges at both $T_3$ and $T_4$.

In one or more embodiments the step of generating comprises feeding the data packet into a lookup table which stores, for each possible data packet, a unique set of values corresponding to signal edges.

In one or more embodiments the step of generating comprises determining, from the lookup table, the set of values corresponding to the data packet.

In one or more embodiments the step of generating comprises loading said values into four shift registers, one associated with each signal; and thereafter shifting said values out of the four shift registers in parallel using a common clock, thereby generating each of the four time-dependent binary signals jointly encoding the data packet.

According to a fifth aspect of the present disclosure there is provided a method of receiving and decoding a data packet sent from a first integrated circuit, IC, to a second IC via a data bus having four data wires, the method comprising:

receiving, at a data receiving interface of the second IC, four time-dependent binary signals which jointly encode the data packet in signal edges thereof, each of the signals being associated with a unique wire of the data bus and spanning a cycle T within which are defined four consecutive time stamps $T_1 \ldots T_4$ at which edges can occur in the signals; and decoding the data packet from the four signals at the data receiving interface, wherein:

irrespective of the data packet content, at each time stamp $T_1 \ldots T_4$ at least one of the plurality of signals has an edge to enable clock recovery at the second IC;

the time difference between $T_2$ and $T_3$ is greater than both the time difference between $T_1$ and $T_2$ and also the time difference between $T_3$ and $T_4$; and no signal has edges at both $T_1$ and $T_2$ and no signal has edges at both $T_3$ and $T_4$.

In one or more embodiments the step of decoding comprises generating a clock signal locally at the data receiving interface which toggles its output whenever a signal edge occurs on any one of the four data wires.

In one or more embodiments the step of decoding comprises populating four shift registers, one associated with each signal, with values corresponding to edges of the received signals, the shift registers being triggered from the clock signal.

In one or more embodiments the step of decoding comprises converting the shift register contents to data bits using a lookup table which stores, for each possible data packet, a unique set of values corresponding to signal edges.

In one or more embodiments, a data alignment operation is performed prior to said step of decoding which compensates for offsets in travel times of the four signals from the first IC to the second IC.

BRIEF DESCRIPTION OF DRAWINGS

Embodiments will be described, by way of example only, with reference to the drawings, in which:

FIG. 6b illustrates the signal states at different positions within the clock recovery circuit of FIG. 6a;

Figure 1:
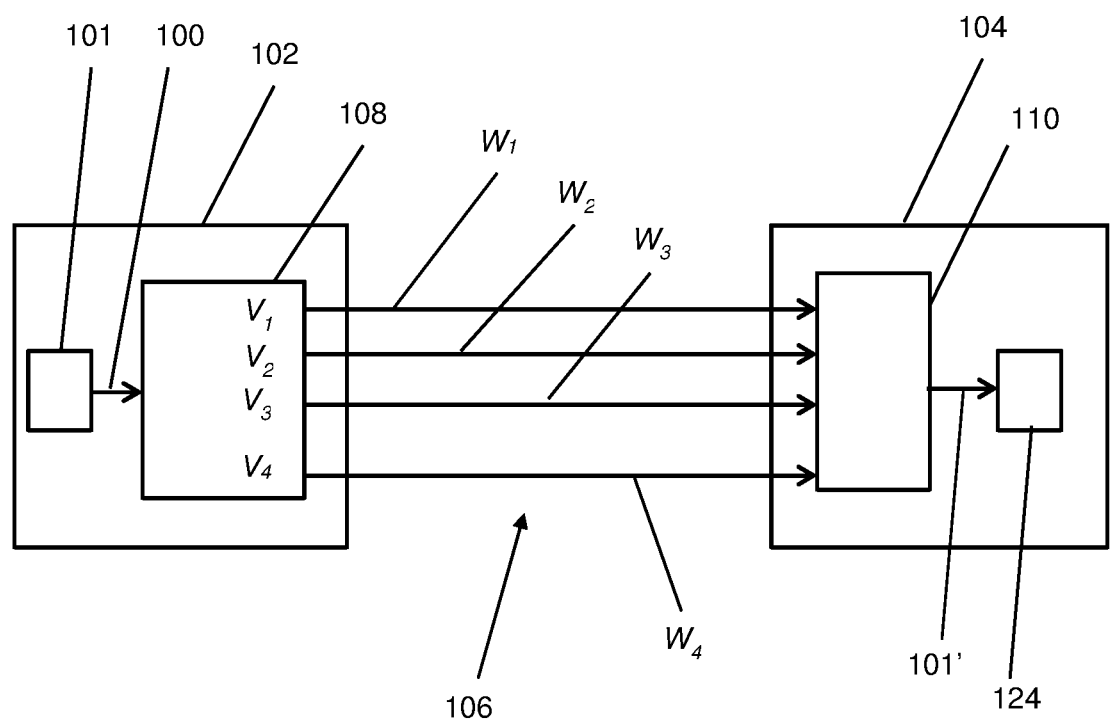
FIG. 1 illustrates schematically an overview of a 4-wire data bus for transmitting a data packet from a first integrated circuit to a second integrated circuit.

It should be noted that the Figures are diagrammatic and not drawn to scale. Relative dimensions and proportions of parts of these Figures have been shown exaggerated or reduced in size, for the sake of clarity and convenience in the drawings. The same reference signs are generally used to refer to corresponding or similar feature in modified and different embodiments.

DETAILED DESCRIPTION OF EMBODIMENTS

Figure 2:
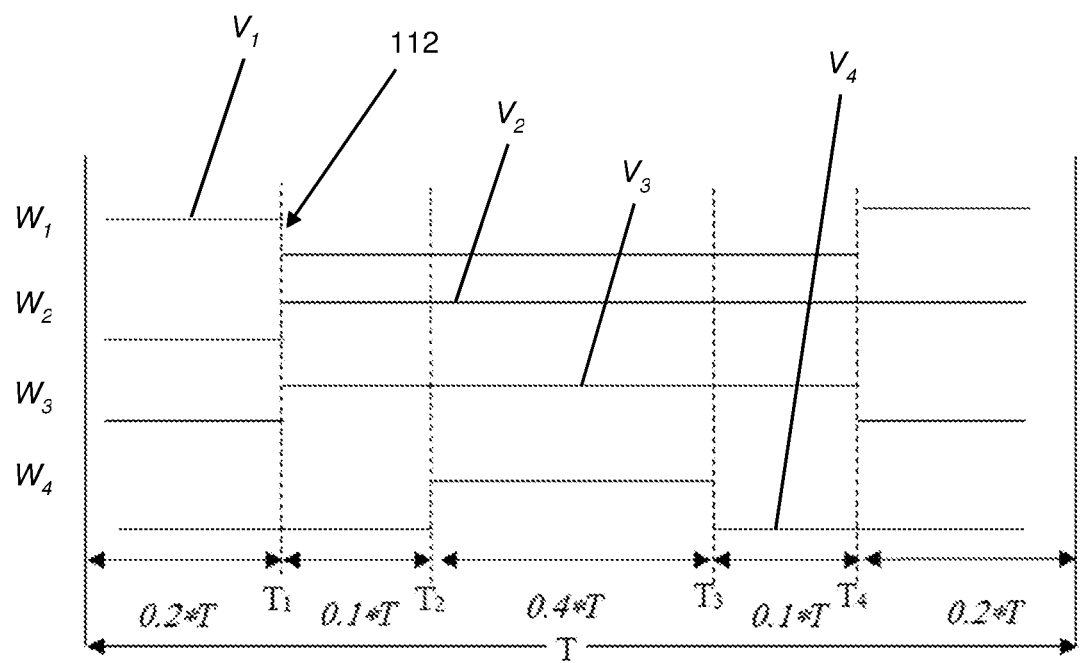
FIG. 2 illustrates four exemplary binary time-dependent signals used to encode a data packet for transmission on the 4-wire data bus.

According to the present disclosure, with reference to FIGS. 1 and 2, a data packet 100 is generated in application logic 101 of a first integrated circuit (IC) 102, i.e. the transmitter IC, and is sent to a second IC 104, i.e. the receiver IC, via a data bus 106 having four data wires $W_1 \ldots W_4$ and without using a clock wire. The transmitter IC comprises a data transmission interface 108 which is arranged to generate four time-dependent binary (i.e. digital) signals $V_1 \ldots V_4$ which jointly encode the data packet in signal edges 112 thereof. A signal edge should be understood to occur at a transition from a high state to a low state of the signal, or alternatively at a transition from low state to a high state of the signal (i.e. at either a 0 to 1 transition or a 1 to 0 transition). Each of the signals is associated with a unique data wire of the data bus 106. Each signal spans a temporal cycle of duration T within which are defined four consecutive time stamps $T_1 \ldots T_4$ at which the signal edges can occur.

The signals in each cycle are transmitted to the receiver IC substantially in parallel on their respective bus data wires. The receiver IC comprises a data receiving interface 110 which is arranged to receive the signals from the transmitter interface via the data bus and decode the original data packet to provide a recovered data packet 101' to application logic 124 of the receiver IC. It should be appreciated that the data bus 106 could have more than one receiving IC connected to it, each of which is capable of monitoring the data bus and 'listening' for a specific addressing signal, for example. Therefore, whilst the embodiments described herein describe a first IC in communication with a second IC over a data bus, it is to be understood that the disclosure also extends to a first IC in communication with two or more ICs over a data bus. Further, it should be appreciated that one or more ICs may have both a data transmission and a data receiving interface, as disclosed herein, such that said or more ICs are capable of bi-directional communication of a data bus.

The encoding scheme is chosen such that at each time stamp $T_1 \ldots T_4$ at least one of the signals has an edge to enable clock recovery locally at the receiver IC, thereby not requiring a dedicated clock signal to be transmitted from the transmitter IC to the receiver IC over a dedicated clock wire. In this manner, since the encoding scheme guarantees that, whatever the content of the data packet, at least one edge will always occur at each time stamp $T_1 \ldots T_4$, it is always possible to recover a full clock signal at the receiver by monitoring when edges occur across the plurality of signals. This allows all wires of the data bus to be used for transmitting data without needing a dedicated clock wire and hence maximizes the possible data bandwidth.

An exemplary encoding scheme according to the present disclosure is described with reference to FIG. 2, which shows a full cycle T within which one data packet is encoded. At each of the four times $T_1 \ldots T_4$ at least one of the four signals $V_1 \ldots V_4$ has an edge to allow clock recovery at the receiver IC. Additionally, at each of the four times $T_1 \ldots T_4$ different signals $V_1 \ldots V_4$ may have an edge. Furthermore, each signal can start at logical high or low into a new adjacent cycle. This is because according to the scheme it is the signal edges, rather than the signal states, which convey the data packet information. Hence the status of a signal does not need to change or be reset from the end of one cycle to the beginning of the next cycle.

In certain scenarios, e.g. to respect timing constraints of certain hardware, it may be beneficial to additionally require that no single signal have an edge at both $T_1$ and $T_2$ and that no signal has an edge at both $T_3$ and $T_4$. However, in such scenarios, if the time stamps are chosen such that the time difference between $T_2$ and $T_3$ is greater than the time difference between $T_1$ and $T_2$ and the time difference between $T_3$ and $T_4$ then a signal can still have edges at adjacent time stamps $T_2$ and $T_3$. In the example of FIG. 2, the first data wire $W_1$ has a first edge at $T_2$ and a second edge at $T_4$ and starts from a logical level 1. The second data wire $W_2$ has only one edge at $T_1$ and starts from logical level 0. The third data wire $W_3$ has a first edge at $T_1$ and a second edge at $T_4$ and starts from logical level 0. The fourth data wire $W_4$ has a first edge at $T_2$ and a second edge at $T_3$ and starts from logical level 0.

Based on the above exemplary constraints (number of edges per cycle being 0, 1 or 2; edge at $T_1$ vs. $T_2$ and $T_3$ vs. $T_4$), a channel capacity of 11 bits per cycle can be reached. This is significantly greater than the capacity of 3 bits per cycle of 4-wire data busses with a dedicated clock wire and one active clock edge (e.g. serial peripheral interface) and 6 bits per cycle as obtainable in dual data-rate 4-wire busses. Based on the above exemplary constraints, there are 50 possible combinations, referred to as code words, for how signal edges can occur at the times $T_1$ and $T_2$ across the four data wires $W_1 \ldots W_4$. These are listed in the table below where the meaning of the numbers is that e.g. "2012" means: the first data wire $W_1$ has an edge at $T_2$; the second data wire $W_2$ has no edge, the third data wire $W_3$ has an edge at $T_1$; and the fourth data wire $W_4$ has an edge at $T_2$. For reading convenience, the table is grouped into three columns.

| Code word | Edges |
|---|---|
| 0 | 0012 |
| 1 | 0021 |
| 2 | 0102 |
| 3 | 0112 |
| 4 | 0120 |
| 5 | 0121 |
| 6 | 0122 |
| 7 | 0201 |
| 8 | 0210 |
| 9 | 0211 |
| 10 | 0212 |
| 11 | 0221 |
| 12 | 1002 |
| 13 | 1012 |

-continued

| Code word | Edges |
|---|---|
| 14 | 1020 |
| 15 | 1021 |
| 16 | 1022 |
| 17 | 1102 |
| 18 | 1112 |
| 19 | 1120 |
| 20 | 1121 |
| 21 | 1122 |
| 22 | 1200 |
| 23 | 1201 |
| 24 | 1202 |
| 25 | 1210 |
| 26 | 1211 |
| 27 | 1212 |
| 28 | 1220 |
| 29 | 1221 |
| 30 | 1222 |
| 31 | 2001 |
| 32 | 2010 |
| 33 | 2011 |
| 34 | 2021 |
| 35 | 2012 |
| 36 | 2201 |
| 37 | 2221 |
| 38 | 2210 |
| 39 | 2212 |
| 40 | 2211 |
| 41 | 2100 |
| 42 | 2102 |
| 43 | 2101 |
| 44 | 2120 |
| 45 | 2122 |
| 46 | 2121 |
| 47 | 2110 |
| 48 | 2112 |
| 49 | 2111 |

A similar, corresponding set of 50 code words applies to the edges which can occur at the times $T_3$ and $T_4$ across the four data wires $W_1 \ldots W_4$. Therefore, in total, according to this example, there are 50*50=2500 combinations within one cycle T which is more than the $2^{11}$=2048 combinations required to encode an 11-bit data packet in a single cycle.

Figure 3:
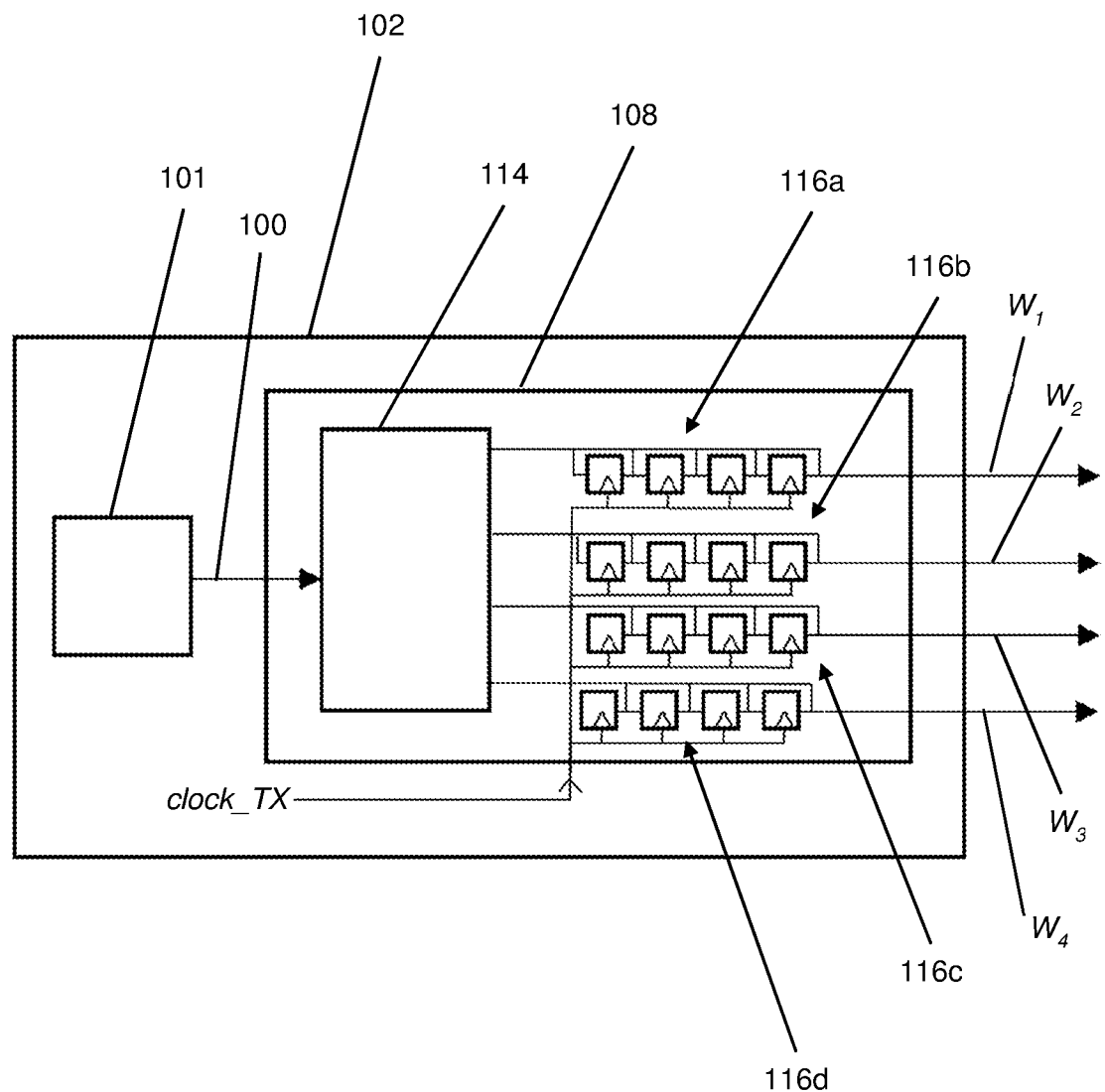
FIG. 3 illustrates schematically an exemplary data transmission interface.

An exemplary data transmission interface 108 according to the present disclosure is described with reference to FIG. 3. The data packet 100, e.g. comprising 11 data bits, is produced by application logic 101 in the transmitter IC (which falls outside of the data transmission interface 108) and is fed into a lookup table 114 which forms part of the data transmission interface. It will be appreciated that the data packet could originate from application logic 101 within the transmitter IC, for example. For each possible unique data packet having 11 bits of data the lookup table stores values indicative of which data wires should have signal edges at which time stamps in a given cycle, based on tables similar to that above. These values are then loaded in parallel into shift registers 116a ... 116d, one associated with each data wire $W_1 \ldots W_4$, at the beginning of each complete cycle T. Each of the shift registers has a length of 4 registers (e.g. 4 flip-flops) corresponding to the four time stamps $T_1 \ldots T_4$ at which edges are allowed to occur within the cycle on each data wire. The shift registers are clocked with a transmitter clock signal clock_TX which has active edges (e.g. rising edges or, in the case of negative-edge-clocked flip-flops, falling edges) at the times $T_1 \ldots T_4$. In this manner, the contents of the four shift registers are shifted out serially, and in synchronisation with each other, to produce the output signals $V_1 \ldots V_4$ on wires $W_1 \ldots W_4$ which jointly encode the data packet in edges thereof. Depending on the contents of the last flip-flop of each shift register, the respective data wire is either toggled or not toggled. As pointed out, encoding is done by signal edges, rather than by signal states and therefore the same code word can start with either a 0 or a 1, depending on the state of the data wire at the end of the previous cycle.

Figure 4:
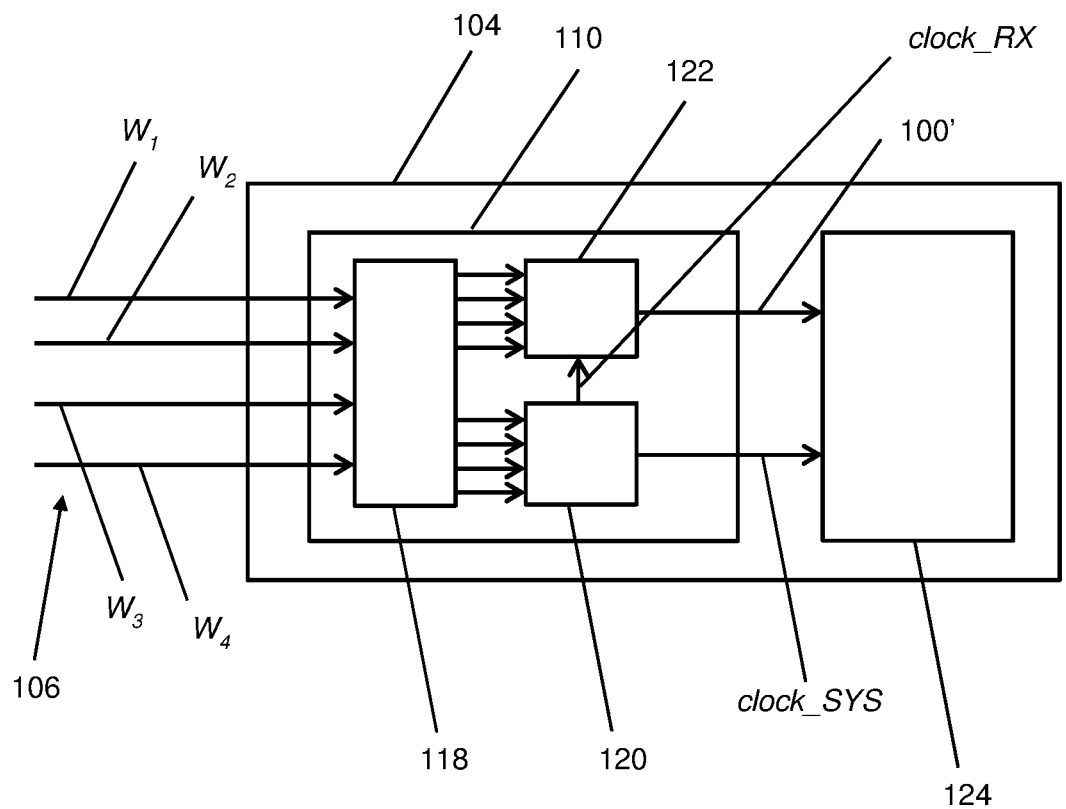
FIG. 4 illustrates schematically an exemplary data receiving interface.

An exemplary data receiving interface 110 according to the present disclosure is described with reference to FIG. 4. The receiver interface 110 forms part of a receiver IC 104 which may also include an application logic portion 124 which receives the recovered data packet 100' from the receiver interface as an input and performs some user-defined processing on it, the nature of which is not particularly relevant to the present disclosure. The exemplary receiver interface comprises a data alignment module 118, a clock recovery circuit 120 and a data recovery circuit 122. The incoming signals on data wires $W_1 \ldots W_4$ are first subject to a data alignment operation in the data alignment module 118, as described in more detail below. The four time-aligned outputs of the data alignment module are sent to both the clock recovery circuit 120 and the data recovery circuit 122.

Figure 5A:
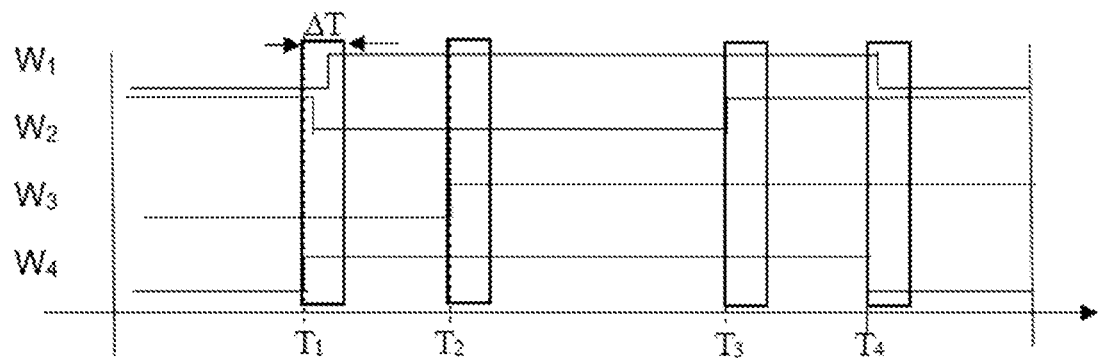
FIGS. 5a and 5b illustrate the operation of a data alignment module used in the data receiving interface.
Figure 5B:
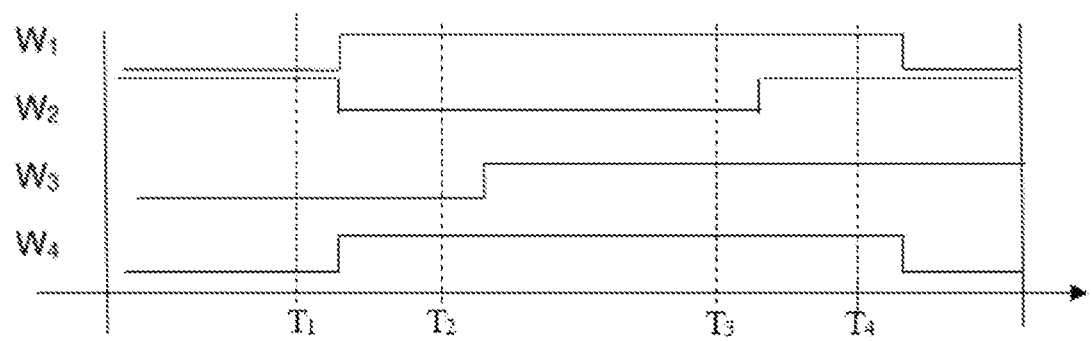

In the real world, the travel times of two signals from the first IC to the second IC are never precisely the same. Therefore, data alignment may be desirable, so that from a first received signal having an edge, a time ΔT is waited, and then the four signals are captured and form the output signals of the data alignment module 118. In this manner, the data alignment module compensates for differences/offsets in travel times of the four signals on the data bus from the first IC to the second IC. However, it will be appreciated that such data alignment is not essential to the operation of the data receiving interface, but may be desirable depending on the nature of the data bus, e.g. length, impedance etc. An example of input signals on data wires $W_1 \ldots W_4$, having slightly different arrival times, with a time difference below a threshold ΔT, is shown in FIG. 5a, using an example code word. An example of the output signals on the output wires $W_1 \ldots W_4$ of the data alignment module after the data alignment operation is shown in FIG. 5b. As can be seen, the slight offsets in the signal edges at each of the time stamps has been corrected by the data alignment module, thereby ensuring that signal edges which were intended to occur at the same time stamp, but which may have become slightly offset due to various factors in the transmitter or the data bus, become realigned prior to being fed to the clock recovery circuit 120 and the data recovery circuit 122.

Figure 6A:
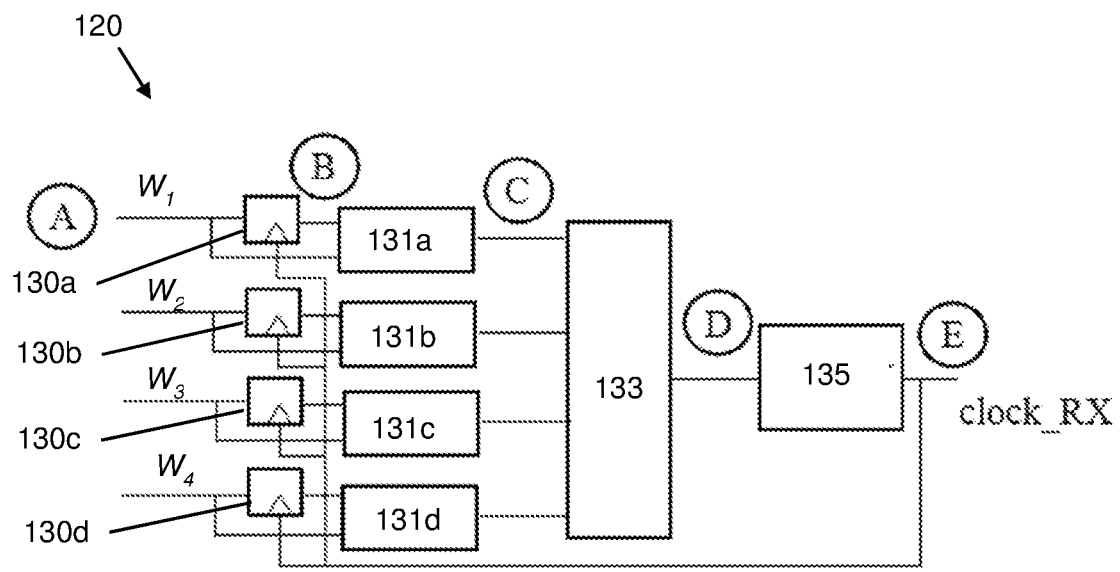
FIG. 6a illustrates schematically an exemplary clock recovery circuit of the data receiving interface.

As the data bus need not have a dedicated clock wire, the clock should be recovered in the data receiving interface. An exemplary clock recovery circuit 120 is shown in FIG. 6a. It is an implementation of a finite state machine (FSM) that toggles its output every time its 4-wire input is changed, the 4-wire input in this case being the time-aligned outputs $W_1 \ldots W_4$ of the data alignment module 118 as described above. The clock recovery circuit comprises four flip-flops 130a ... 130d, one associated with each data wire, the outputs of which are fed to four XOR gates 131a ... 131d. The XOR gates output a 1 in the case that the signal has changed at the last time stamp (i.e. had an edge), and it outputs a 0 in the case that the signal has not changed at the last time stamp (i.e. did not have an edge). The four XOR outputs are then combined at an OR gate 133 which hence outputs a 1 if at least one of the signals has changed. Finally, a delay unit 135 provides a new clock signal which is fed back to the flip-flops in order to reset them for the next set of edges, thereby resulting in a clock signal clock_RX which consists of short pulses at each time stamp. The output of the FSM serves as the clock signal clock_RX used by the data recovery circuit 122. Additionally, a clock signal clock_SYS representing the reception of a complete code word is also generated by the clock recovery circuit 120 by counting the clock edges of a code word using a counter module (not shown) connected to the clock_RX output.

Figure 6B:
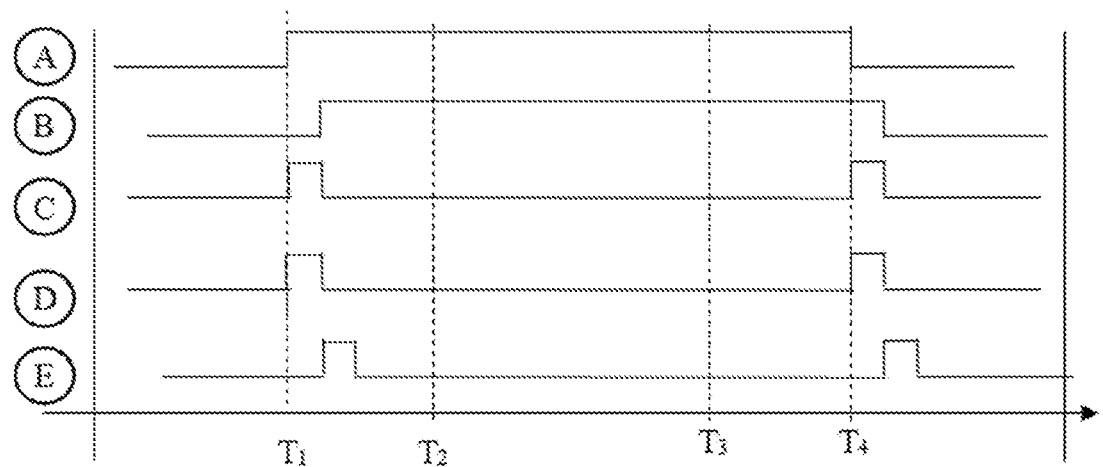
Figure 7:
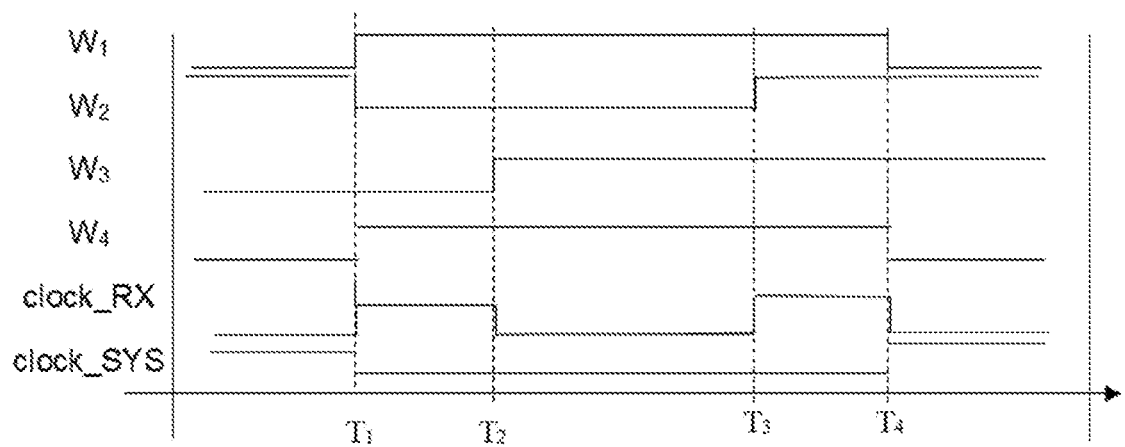
FIG. 7 illustrates four exemplary time-dependent signals after data alignment at the data receiving interface and the corresponding clock signals derived locally therefrom.

The signal states at the circuit locations labelled A to E in FIG. 6a are shown in FIG. 6b for a complete cycle and only taking into consideration the first data wire $W_1$. It will be appreciated that there would also be signal changes on other wires at times $T_2$ and $T_3$ leading to additional edges in the clock signal at these times, such that a clock edge occurs at each time stamp. The two recovered clock signals clock_RX and clock_SYS are shown in FIG. 7 for a complete example code word encoded across the four data wires.

Figure 8:
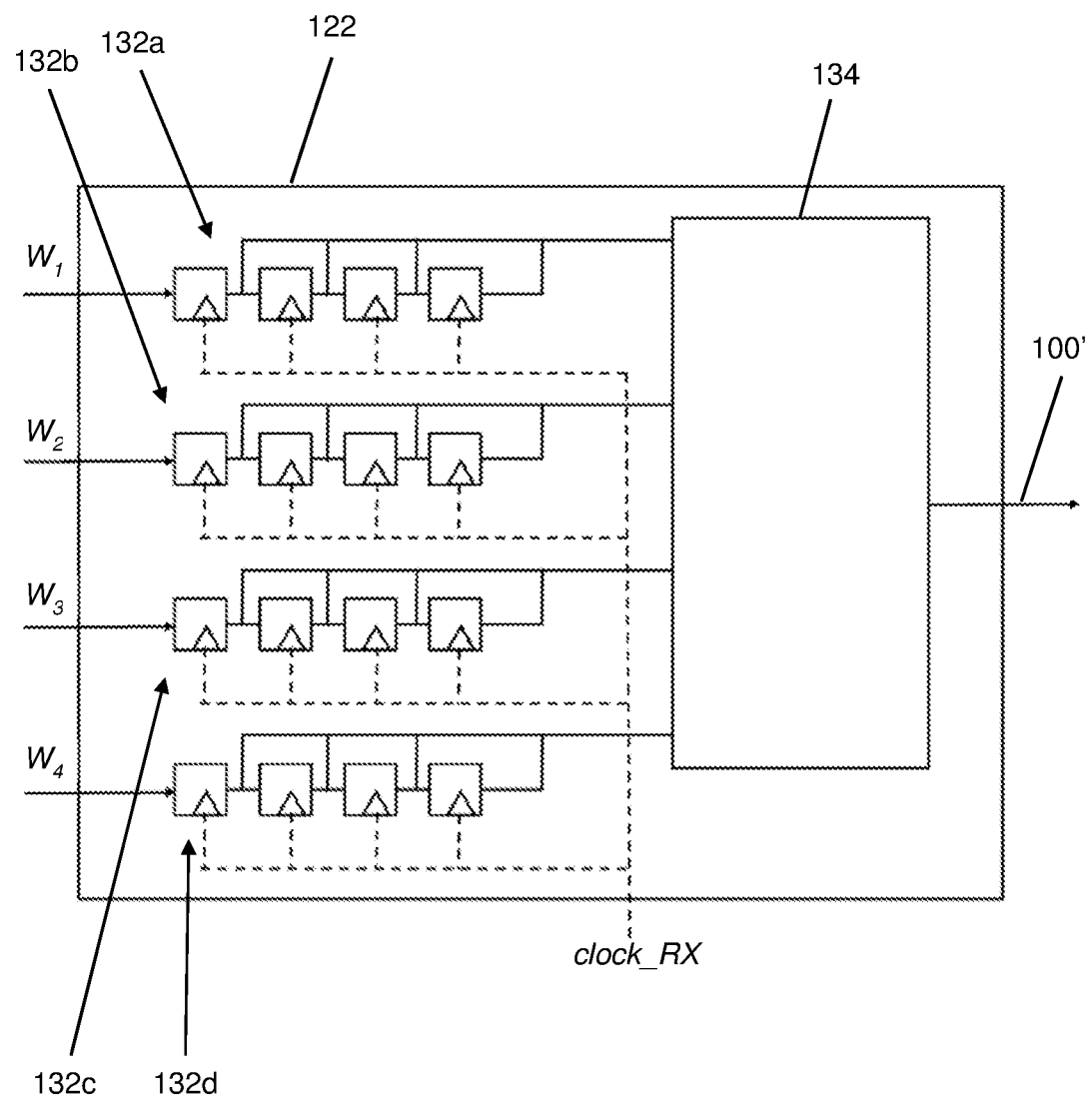
FIG. 8 illustrates schematically an exemplary data recovery circuit of the data receiving interface.

An exemplary data recovery circuit 122 is shown in FIG. 8. It is essentially the reverse of the data transmission interface shown in FIG. 3. As mentioned, the data recovery is sensitive on signal edges rather than on the status of the signals. The data recovery circuit employs four 4-bit shift registers 132a . . . 132d, one associated with each output wire of the data alignment module 118. The shift registers have dual-edge triggered flip-flops which take the locally generated clock_RX signal as an input such that the shift registers are loaded with values corresponding to the received signals, i.e. the status of the flip-flop changes when a clock edge occurs and an edge occurs at the same time on the received signal. At the end of each cycle, the contents of the shift registers are converted to data bits using a lookup table 134 which produces as its output the recovered data packet 100' which can then be used by the receiver application logic 124. The lookup table is similar to that described above with reference to the data transmission interface.

Communication between two ICs in the manner described herein is often used between a frontend IC, which senses or receives data, and a backend IC performing analysis of the data. Such transmission is often also often used for system self-test in the field, where the application mode is interrupted in regular intervals and a CPU, for example, accesses analogue or mixed-signal instruments of another IC for verifying correct operation, e.g. using an IEEE 1687-compliant infrastructure.

It should be appreciated that embodiments disclosed herein can be realised either in positive or in negative logic. In positive logic, which is the most common form, logic 0 corresponds to a lower voltage, while logic 1 corresponds to a higher voltage. In negative logic, logic 0 corresponds to a higher voltage.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality and reference signs in the claims shall not be construed as limiting the scope of the claims.

The invention claimed is:

1. A data transmission interface for use in a first integrated circuit (IC) for encoding and sending a data packet from the first IC to a second IC via a data bus having four data wires, the data transmission interface arranged to generate four time-dependent binary signals which jointly encode the data packet in signal edges thereof, each of the signals being associated with a unique wire of the data bus and spanning a temporal cycle T within which are defined four consecutive time stamps $T_1 \ldots T_4$ at which edges can occur in the signals, the data transmission interface further arranged to transmit the signals to the second IC substantially in parallel on their respective data wires, wherein:

irrespective of a data packet content, at each time stamp $T_1 \ldots T_4$ at least one of the four signals has an edge to enable clock recovery at the second IC;

a time difference between $T_2$ and $T_3$ is greater than both a time difference between $T_1$ and $T_2$ and also a time difference between $T_3$ and $T_4$; and no signal has edges at both $T_1$ and $T_2$ and no signal has edges at both $T_3$ and $T_4$.

2. The data transmission interface according to claim 1, comprising a lookup table which stores, for each possible data packet, a unique set of values corresponding to signal edges, the data transmission interface arranged to determine, from the lookup table, the set of values corresponding to said data packet.

3. The data transmission interface according to claim 2, further comprising four shift registers, one associated with each signal, the data transmission interface arranged to load said set of values into the shift registers and thereafter shift said set of values out of the shift registers in parallel using a common clock, thereby generating the four time-dependent binary signals jointly encoding the data packet.

4. The data transmission interface according to claim 1, wherein the time difference between $T_2$ and $T_3$ is at least twice the time difference between $T_1$ and $T_2$ and at least twice the time difference between $T_3$ and $T_4$.

5. The data transmission interface according to claim 4, wherein within the cycle T, times stamps $T_1 \ldots T_4$ are given by:

$$T_1 = 0.2*T;$$

$$T_2 = T_1 + 0.1*T;$$

$$T_3 = T_2 + 0.4*T; \text{ and}$$

$$T_4 = T_3 + 0.1*T.$$

6. The data transmission interface according to claim 1, wherein the data packet comprises 11 bits of data and the cycle T has a duration of less than 50 ns, such that a data transmission rate of at least 1 Gbit per second can be achieved.

7. A data transmission system comprising the first integrated circuit (IC) having the data transmission interface according to claim 1 connected to the second IC having a data receiving interface via the data bus having four data wires.

8. A data receiving interface for use in a second integrated circuit (IC) for receiving and decoding a data packet sent from a first IC to the second IC via a data bus having four data wires, the data receiving interface arranged to receive four time-dependent binary signals which jointly encode the data packet in signal edges thereof, each of the signals being associated with a unique wire of the data bus and spanning a temporal cycle T within which are defined four consecutive time stamps $T_1 \ldots T_4$ at which edges can occur in the signals, the data receiving interface further arranged to decode the data packet from the four signals, wherein:

irrespective of a data packet content, at each time stamp $T_1 \ldots T_4$ at least one of the four signals has an edge to enable clock recovery at the data receiving interface;

a time difference between $T_2$ and $T_3$ is greater than both a time difference between $T_1$ and $T_2$ and also a time difference between $T_3$ and $T_4$; and no signal has edges at both $T_1$ and $T_2$ and no signal has edges at both $T_3$ and $T_4$.

9. The data receiving interface according to claim 8, comprising a clock recovery circuit arranged to generate a clock signal which toggles its output whenever a signal edge occurs on any one of the four data wires.

10. The data receiving interface according to claim 9, wherein the clock recovery circuit comprises a finite state machine.

11. The data receiving interface according to claim 9, further comprising a data recovery circuit arranged to receive the clock signal and the four time-dependent binary signals as inputs and to decode the data packet therefrom.

12. The data receiving interface according to claim 11, wherein the data recovery circuit comprises:

four shift registers, one associated with each of the four signals, the shift registers arranged to be populated with values corresponding to edges of the received signals and to be triggered from the clock signal; and a lookup table which stores, for each possible data packet, a unique set of values corresponding to signal edges, the lookup table arranged to convert output contents of the shift registers to thereby decode the data packet.

13. The data receiving interface according to claim 8, further comprising a data alignment module arranged to compensate offsets in travel times of the four signals from the first IC to the second IC.

14. The data receiving interface according to claim 8, wherein the time difference between $T_2$ and $T_3$ is at least twice the time difference between $T_1$ and $T_2$ and at least twice the time difference between $T_3$ and $T_4$.

15. The data receiving interface according to claim 14, wherein within the cycle T, times stamps $T_1 \ldots T_4$ are given by:

$$T_1 = 0.2 * T;$$

$$T_2 = T_1 + 0.1 * T;$$

$$T_3 = T_2 + 0.4 * T; \text{ and}$$

$$T_4 = T_3 + 0.1 * T.$$

16. The data receiving interface according to claim 8, wherein the data packet comprises 11 bits of data and the cycle T has a duration of less than 50 ns, such that a data transmission rate of at least 1 Gbit per second can be achieved.

17. A data receiving system comprising the second integrated circuit (IC) having the data receiving interface according to claim 8 connected to the first IC having a data transmitting interface via the data bus having four data wires.

18. A method of encoding and sending a data packet from a first integrated circuit (IC) to a second IC via a data bus having four data wires, the method comprising:

generating, at a data transmission interface of the first IC, four time-dependent binary signals which jointly encode the data packet in signal edges thereof, each of the signals being associated with a unique wire of the data bus and spanning a cycle T within which are defined four consecutive time stamps $T_1 \ldots T_4$ at which edges can occur in the signals; and transmitting the signals to the second IC substantially in parallel on their respective bus wires, wherein:

irrespective of a data packet content, at each time stamp $T_1 \ldots T_4$ at least one of the four signals has an edge to enable clock recovery at the second IC;

a time difference between $T_2$ and $T_3$ is greater than both a time difference between $T_1$ and $T_2$ and also a time difference between $T_3$ and $T_4$; and no signal has edges at both $T_1$ and $T_2$ and no signal has edges at both $T_3$ and $T_4$.

19. A method of receiving and decoding a data packet sent from a first integrated circuit, IC, to a second IC via a data bus having four data wires, the method comprising:

receiving, at a data receiving interface of the second IC, four time-dependent binary signals which jointly encode the data packet in signal edges thereof, each of the signals being associated with a unique wire of the data bus and spanning a cycle T within which are defined four consecutive time stamps $T_1 \ldots T_4$ at which edges can occur in the signals; and decoding the data packet from the four signals at the data receiving interface, wherein:

irrespective of a data packet content, at each time stamp $T_1 \ldots T_4$ at least one of the plurality of signals has an edge to enable clock recovery at the second IC;

a time difference between $T_2$ and $T_3$ is greater than both a time difference between $T_1$ and $T_2$ and also a time difference between $T_3$ and $T_4$; and no signal has edges at both $T_1$ and $T_2$ and no signal has edges at both $T_3$ and $T_4$.

* * * * *